(12) United States Patent
Broyles et al.

(10) Patent No.: US 6,405,311 B1
(45) Date of Patent: Jun. 11, 2002

(54) METHOD FOR STORING BOARD REVISION

(75) Inventors: Paul J. Broyles, Cypress; Mark A. Piwonka, Tomball; Daniel G. Parsons, Houston, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/123,672

(22) Filed: Jul. 28, 1998

(51) Int. Cl.[7] .............................. G06F 9/00; G06F 9/24; G06F 15/177; G06F 1/24
(52) U.S. Cl. ................................. 713/2; 713/1; 713/100
(58) Field of Search ................................. 713/1, 2–200, 713/201, 100; 380/23; 707/10, 104, 201, 203

(56) References Cited

U.S. PATENT DOCUMENTS

| | | | | |
|---|---|---|---|---|
| 4,769,767 A | * | 9/1988 | Hilbrink | 364/200 |
| 4,827,330 A | * | 5/1989 | Walsh | 358/280 |
| 5,579,522 A | * | 11/1996 | Christeson et al. | 713/2 |
| 5,652,906 A | * | 7/1997 | Kandosumi | 395/800 |
| 5,675,825 A | * | 10/1997 | Dreyer et al. | 395/800 |
| 5,835,594 A | * | 11/1998 | Albrecht | 380/23 |
| 5,867,714 A | * | 2/1999 | Todd | 395/712 |
| 5,897,636 A | * | 4/1999 | Kaeser | 707/100 |
| 5,930,504 A | * | 7/1999 | Gabel | 395/652 |
| 5,964,873 A | * | 10/1999 | Choi | 713/2 |
| 6,049,550 A | * | 4/2000 | Baydar et al. | 370/466 |
| 6,076,161 A | * | 6/2000 | Ho | 713/2 |
| 6,223,293 B1 | * | 4/2001 | Foster et al. | 713/300 |

* cited by examiner

Primary Examiner—Thomas Lee
Assistant Examiner—Chun Cao
(74) Attorney, Agent, or Firm—Akin, Gump, Strauss, Hauer & Feld, LLP

(57) ABSTRACT

A computer system contains a revision indicator which is stored in a protected special area of computer memory. The revision indicator specifies the revision of the hardware actually present in the system. The revision indicator data is presented by the computer during power up so that a user may be aware of the type and configuration of the computer system hardware. The revision indicator may be displayed by the computer system BIOS during power on self test (POST), for example. The memory storing the revision indicator is protected from erroneous or unauthorized change.

23 Claims, 3 Drawing Sheets

METHOD FOR STORING BOARD REVISION

BACKGROUND OF THE INVENTION

1. Field of the Invention

The present invention is related to system level computer operation, and more specifically, to hardware identification measures for computer system software.

2. Description of the Related Art

As the computer industry has evolved, different versions of hardware and software have been introduced over time. For example, microprocessors, modems, and bus structures operate at much faster data rates than similar devices introduced only a few years ago. Software, one of the most rapidly developing areas of computer technology, however, often is compatible with only some versions of a particular hardware platform. In other situations, software has greater functionality with particular versions of a hardware platform than with other versions.

Because software developers generally cannot know precisely which version of a particular hardware platform will be used to run their products, software developers often write generic computer programs to run on all versions. However, modem hardware not only runs faster than in previous generations; additional features, not available on previous versions, allow functionality unimaginable by programmers only a few years ago. Software meant to run optimally across several generations of hardware cannot take advantage of specialized features of a particular hardware platform, unless those features are available on all versions. Consequently, some features cannot be accessed by software.

This lowest common denominator problem appears only to be getting more problematic. As software development moves toward cross-platform portable code (for example, on Internet-driven Java-based virtual machines) hardware platforms become less visible to the software. Some software loses backward-compatibility, engendering hostility in paying customers who have already made significant hardware investments now rendered obsolete by the quantum advance in the software evolution. Other software is marketed toward only those customers who have the latest version of the hardware platform, limiting the software's ability to appeal to the wider market.

Software, particularly software directed to a particular virtual machine, therefore, often under-performs by failing to take advantage of functional features presented by the latest actual hardware, since the software is designed to run on any version. Alternatively, software performs with full-feature platform-specific richness, but excludes large portions of the otherwise interested software-purchasing market. Moreover, the latter type of software becomes obsolete if the hardware platform ever falls into disfavor.

Many computer systems do contain hardware-encoded revision information, encoded by placing pull-up and pull-down resistors and a shift register motherboard. The resistors have typically loaded a value into the shift register when power is applied to the system. This method is effective, but difficult to update once the computer system has been provided to an end user or even to a VAR (value added reseller). Moreover, the resistor and the shift register cost money and occupied valuable board space.

An additional problem is the difficulty of upgrading all computer systems manufactured across an enterprise. Because the resistor and register approach is a hardware implementation system, changes have required physical substitutions or changes, or other time-intensive system-by-system manipulation,

SUMMARY OF THE INVENTION

Briefly, the present invention allows manufacturing entities to place a "revision indicator" in a special area of memory that cannot be altered. The revision indicator is stored in a region of memory not available to the user. The protected area is a flash memory, which must be physically removed to be reprogrammed.

A person must physically remove the memory device containing the revision indicator, place the revision indicator memory in an external device that is not part of the computer system, and apply external voltages and currents not available within the computer system to the memory in order to change the revision indicator.

When a user powers on the computer system, the revision indicator is presented to the basic input/output system or BIOS, and is available while the boot software is running. For example, the revision indicator may be presented during the installation and execution of the Basic Input Output System (BIOS), Power on Self Test (POST), and operating system.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following disclosures are hereby incorporated by reference:

U.S. application Ser. No. 09/071,127, entitled "A COMPUTER METHOD AND APPARATUS TO FORCE BOOT BLOCK RECOVERY," by Don R. James, Jr., Randall L. Hess, and Jeffrey D. Kane, filed Apr. 30, 1998;

U.S. application Ser. No. 09/070,821, entitled "BOOT BLOCK SUPPORT FOR ATAPI REMOVABLE MEDIA DEVICES," by Paul J. Broyles and Don R James, Jr., filed Apr. 30, 1998;

U.S. application Ser. No. 09/070,475, entitled "SECURITY METHODOLOGY FOR DEVICES HAVING PLUG AND PLAY CAPABILITIES," by Christopher E. Simonich and Robin T. Tran, filed Apr. 30, 1998;

U.S. application Ser. No. 09/070,942, entitled "METHOD AND APPARATUS FOR REMOTE ROM FLASHING AND SECURITY MANAGEMENT FOR A COMPUTER SYSTEM," by Manuel Novoa, Paul H. McCann, Adrian Chrisan. and Wayne P. Sharurn, filed Apr. 30, 1998;

U.S. application Ser. No. 09/070,866, entitled "A METHOD FOR FLASHING ESCD AND VARIABLES INTO A ROM," by Mark A. Piwonka, Louis B. Hobson, Jeff D. Kane, and Randall L. Hess, filed Apr. 30, 1998;

U.S. application Ser. No. 08/684,413, entitled "FLASH ROM PROGRAMMING," by Patrick R. Cooper, David J. Delisle, and Hung Q. Le filed Jul. 19, 1996; and U.S. application Ser. No. 09/071,128, entitled "A UNIFIED PASSWORD PROMPT OF A COMPUTER SYSTEM," by Michael D. Garrett, Randall L. Hess, Chi W. So, Mohammed Anwarmariz, filed Apr. 30, 1998;

U.S. application Ser. No. 09/123,658, entitled "OWNERSHIP TAG ON POWER-UP SCREEN," by Paul J. Broyles, m, Rahul G. Patel and Mark A. Piwonka, filed of even date herewith; and U.S. application Ser. No. 09/123,307, entitled "COMPUTER SYSTEM WITH POST SCREEN FORMAT CONFIGURABILITY," by Rahul J. Patel and Paul J. Broyles, III, filed concurrently herewith, all of which are assigned to the assignee of this invention.

COMPUTER SYSTEM OVERVIEW

Figure 1:
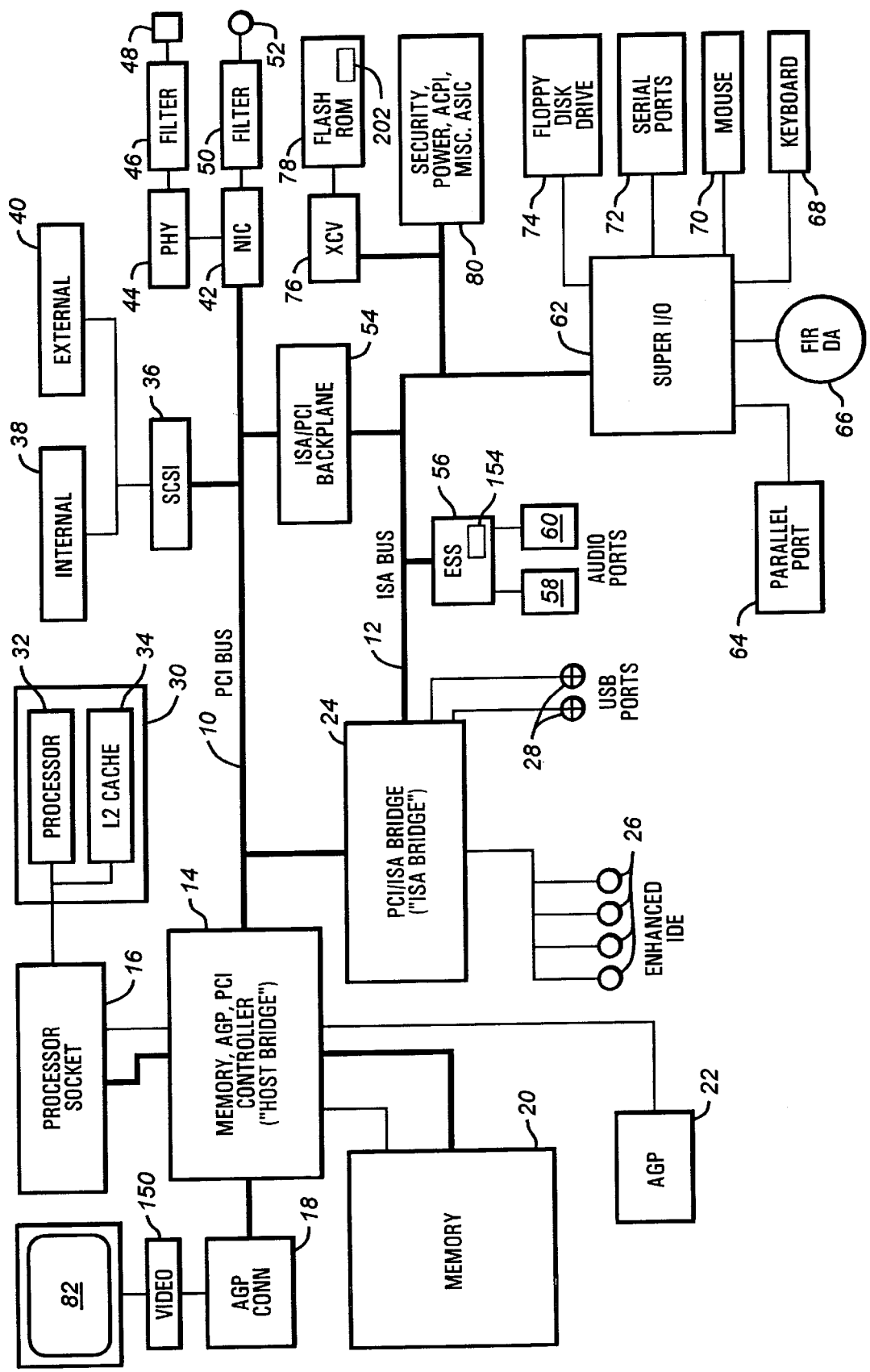
FIG. 1 is a schematic block diagram of a computer system according to the present invention.

Turning to FIG. 1, illustrated is a typical computer system S implemented according to the invention. While this system is illustrative of one embodiment, the techniques according to the invention can be implemented in a wide variety of systems. The computer system S in the illustrated embodiment is a PCI bus/ISA bus based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, an AGP connector 18, a memory subsystem 20, and an AGP 22. A second bridge circuit, a PCI/ISA bridge 24 (the "ISA bridge") bridges between the PCI bus and the ISA bus 12.

The host bridge 14 in the disclosed embodiment is a 440LX Integrated Circuit by Intel Corporation, also known as the PCI AGP Controller (PAC). The ISA bridge 24 is a PIIX4, also by Intel Corporation. The host bridge 14 and ISA bridge 24 provide capabilities other than bridging between the processor socket 16 and the PCI bus 10, and the PCI bus 10 and the ISA bus 12. Specifically, the disclosed host bridge 14 includes interface circuitry for the AGP connector 18, the memory subsystem 20, and the AGP 22. The ISA bridge 24 further includes an internal enhanced WDE controller for controlling up to four enhanced IDE drives 26, and a universal serial bus (USB) controller for controlling USB ports 28.

The host bridge 14 is preferably coupled to the processor socket 16, which is preferably designed to receive a Pentium II processor module 30, which in turn includes a microprocessor core 32 and a level two (L2) cache 34. The processor socket 16 could be replaced with different processors other than the Pentium II without detracting from the spirit of the invention.

The host bridge 14, when the Intel 440LX North Bridge is employed, supports extended data out (DO) dynamic random access memory (DRAM) and synchronous DRAM (SDRAM), a 64/72-bit data path memory, a maximum memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridge 14 support up to 66 megahertz DRAMs, whereas the processor socket 16 can support various integral and nonintegral multiples of that speed.

The ISA bridge 24 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a dynamic memory access (DMA) controller, two 82C59 interrupt controllers, an 8254 timer, a real time clock (RTC) with a 256 byte complementary metal oxide semiconductor (CMOS) static RAM (SRAM), and chip selects for system read only memory (ROM), real time clock (RTC), keyboard controller, an external microcontroller, and two general purpose devices. The enhanced power management within the ISA bridge 24 includes full clock control, device management, suspend and resume logic, advanced configuration and power interface (ACPI), and system management bus (SUMus) control, which implement the inter-integrated circuit ($I^2C$) protocol.

The PCI bus 10 couples a variety of devices that generally take advantage of a high speed data path. This includes a small computer system interface (SCSI) controller 26, with both an internal port 38 and an external port 40. In the disclosed embodiment, the SCSI controller 26 is a AIC-7860 SCSI controller. Also coupled to the PCI bus 10 is a network interface controller (NIC) 42, which preferably supports the ThunderLan™ power management specification by Texas Instruments. The NIC 42 is coupled through a physical layer 44 and a filter 46 to an RJ45 jack 48, and through a filter 50 to a AUI jack 52.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and an audio out port 60. The ISA bus 12 also couples the ISA bridge 24 to a Super I/O chip 62, which in the disclosed embodiment is a National Semiconductor Corporation PC87307VUL device. This Super I/O chip 62 provides a variety of input/output functionality, including a parallel port 64, an infrared port 66, a keyboard controller for a keyboard 68, a mouse port for a mouse port 70, additional series ports 72, and a floppy disk drive controller for a floppy disk drive 74. These devices are coupled through connectors to the Super I/O 62.

The ISA bus 12 is also coupled through bus transceivers 76 to a flash ROM 78, which can include both basic input/output system (BIOS) code for execution by the processor 32, as well as an additional code for execution by microcontrollers in a ROM-sharing arrangement.

The ISA bus 12 further couples the ISA bridge 24 to a security, power, ACPL and miscellaneous application specific integrated circuit (ASIC) 80, which provides a variety of miscellaneous functions for the system. The ASIC 80 includes security features, system power control, light emitting diode (LED) control a PCI arbiter, remote wake up logic, system fan control, hood lock control, ACPI registers and support, system temperature control, and various glue logic.

Finally, a video display 82 can be coupled to the AGP connector 18 through an AGP master or video card 150 for display of data by the computer system S. The video display 82 displays video and graphics data provided by a video display process running on either the processor module 30 or another by a PCI device bus master or PCI bridge device bus master via host bridge 14. Video or graphics data may be stored in main memory or in a supplementary or extension memory module. Again, a wide variety of systems could be used instead of the disclosed system S without detracting from the spirit of the invention.

According to the present invention, certain memory locations, such as indicated at 202 (FIG. 2) in the flash ROM 78, having additional protection from alteration contain a revision indicator. The revision indicator so stored identifies the version of the hardware platform of computer system S. When processor module 30 is booted, a basic input output system (BIOS) is loaded and executed on processor module 30. According to the present invention, a processor associated with the BIOS obtains the revision indicator from the protected area of memory and displays the revision indicator on display 82.

THE FLASH ROM BOOT BLOCK

Figure 2:
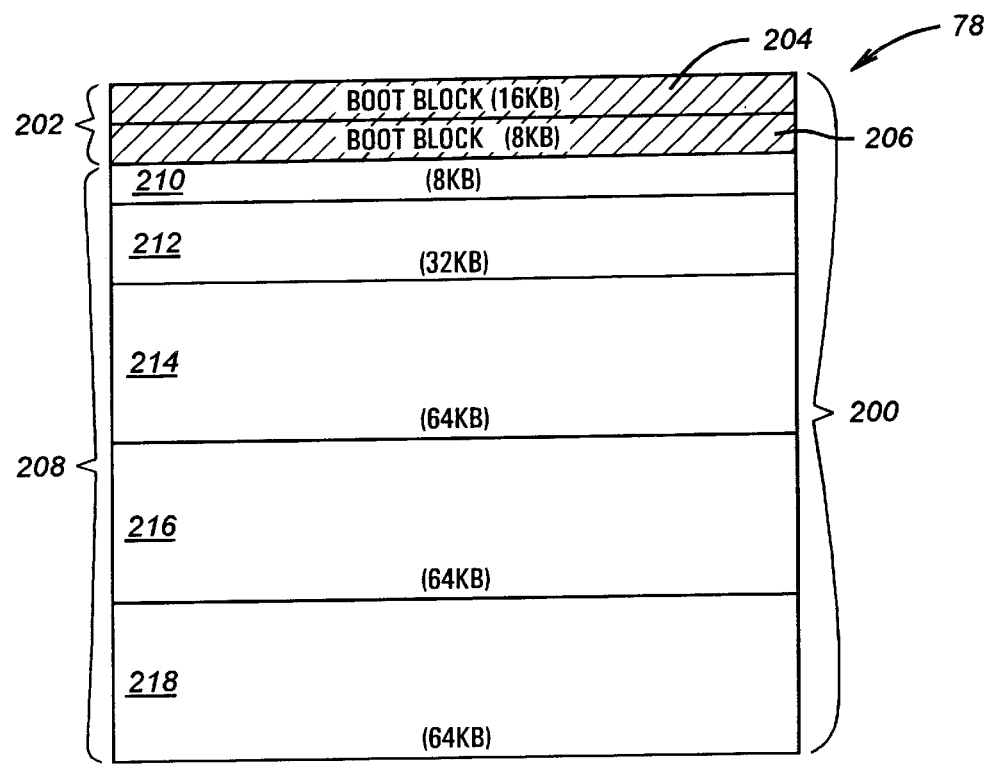
FIG. 2 is a schematic diagram of flash ROM components of the computer system of FIG. 1.

Turning now to FIG. 2, a sector partitioning structure 200 of the flash ROM 78 in the disclosed embodiment is shown. However, while this diagram is illustrative of one embodiment, the techniques according to the invention can be implemented in a variety of embodiments and can be implemented with a variety of non-volatile memory. The sector partitioning structure 200 is determined by the sector architecture of the particular flash ROM 78. The flash ROM 78 used in the disclosed embodiment is an Advanced Micro Devices (AMD) AM29F002 flash ROM memory. The sector partitioning structure 200 shows a top boot block design architecture. The Advanced Micro Devices AM29F002 flash ROM memory can also be implemented with a bottom boot block design architecture.

A boot block sector 202 consists of a first boot block sector 204 of 16 kilobytes and a second boot block sector 206 of 8 kilobytes. The remaining 232 kilobytes form a system block 208 divided into 5 sectors 210–218. In the disclosed embodiment, the first sector 210 has 8 kilobytes, the second sector 212 has 32 kilobytes, and the remaining three sectors 214, 216, and 218 have 64 kilobytes equally. The code stored in the system block 208 preferably contains the Basic Input/Output System (BIOS) code. The BIOS is code interfacing between the operating system and the specific hardware configuration, allowing the same operating system to be used with different hardware configurations. The boot block 202 contains the code necessary to initialize the systems when an anomaly during power-up is detected. During a boot block 202 initialization, preferably a reduced set of hardware is initialized, thus reducing the size of the code in the boot block 202. The boot block 202 code typically contains an initialization procedure for only the hardware necessary to perform limited functions. Typically a limited function necessary to be performed during boot block 202 initialization is the flash of the ROM 78. The boot block 202, according to the invention, contains code initializing the hardware components necessary to flash the ROM 78 and to prompt the user for an administrative password. The boot block 202 code is contained within the boot block 202, which is protected from spurious initialization.

The boot block 202 is stored in a region or protected area of memory not available to the user. Such a protected area is a flash memory which must be physically removed to be reprogrammed. A person must physically remove the boot block 202 containing the revision indicator and place that memory device in an external device to the computer system to reprogram it. Further, such a memory device is preferably one which for reprogramming requires voltage or current devices not available within the computer system S. In this way, the memory containing the revision indicator cannot be inadvertently reprogrammed while in the computer system.

The boot block is an additional portion of ROM code within the ROM 78 that is executed at system reset. The boot block contains a validation portion and a boot portion. Upon system reset, the validation portion performs a validation check on the system ROM 78 itself and either jumps to the normal system ROM code or to the boot portion, depending upon the result of the validation check (See step 500 of FIG. 5.) The boot portion, although not capable of initializing any add-in devices except IDE's, does contain enough code to allow a system administrator to flash a valid ROM code into ROM 78 from a diskette. The boot block is physically located within the ROM to be accessed by the reset vector. The flash ROM 78 contains a 16 KB sector, two 8 KB sectors, a 32 KB sector, and three 64 KB sectors. The boot block occupies the first two sectors (totaling 24 KB), and is followed by an 8 KB ESCD sector, a reserved 32 KB sectors, a 64 KB sector containing normal-mode ROM code, 64 KB of compressed data, and 64 KB of CPU BIOS update code. The boot block 202 code typically is small in relation to the system block 208 code.

The BIOS has no access to the screen, so uses the various keyboard LEDS (such as Caps Lock, Num Lock and Scroll Lock) to report states and error information.

According to the present invention, the revision indicator is stored in a protected area of flash ROM. The revision indicator is placed in the boot block sector 202 in flash ROM 78 at the factory during the manufacturing process. The board revision information is preferably placed into the binary ROM image at a specified physical location (3FFD4b into buffer, for example) before the ROM 78 is flashed and the boot block sector 202 is protected.

Since the revision indicator is placed in the boot block sector 202 of flash ROM 78, the information is not flashable. Further, the boot block 202 exists as a secondary mechanism for bad ROM flashes.

Figure 3:
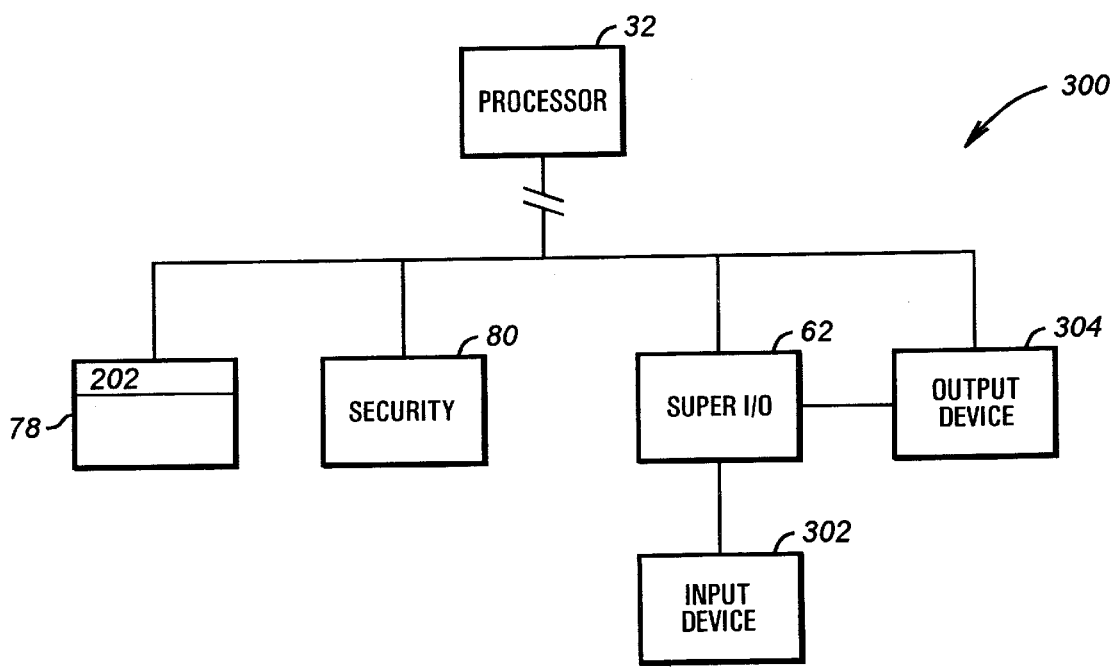
FIG. 3 is a block diagram of components initialized by a boot block in the computer system of FIG. 1.

Turning to FIG. 3, illustrated is a block diagram 300 of components of the system S that are initialized by the boot block 202. The processor 32 copies the system block code 208 from the ROM 78 into RAM, creating the ROM image, and then executes the system block 208 code, including the boot block 202 code contained in the ROM image. The processor 32, during initial power up and execution of boot block 202 code, executes the validation portion to determine if the flash ROM 78 has become corrupt. If the flash ROM 78 is corrupt, then the processor 32 executes the boot portion of the boot block to allow an administrator to re-flash portions of the boot block 202 code from a diskette. Also, during initial power up, when reflashing is not needed, the Super I/O device 62 and the security device 80 are initialized by the processor 32. BIOS code is also loaded from the ROM into RAM. Upon initialization of the Super I/O device 62, the system board revision resident in boot block 202 is provided to the BIOS and stored in NVRAM for use during routine/OS.

Whichever boot code the validation portion determines to use is loaded into RAM (volatile memory). The RAM is faster than the ROM itself When power is applied to the system, the BIOS is booted from the ROM, via the image. The BIOS then attempts to complete system initialization in normal mode unless interrupted during initialization. BIOS execution continues from the RAM and, upon conclusion, launches the operating system.

The revision indicator indicates the revision of the hardware platform of the computer system. A user operating the computer system can access the location of the CMOS containing the revision indicator, but does not know where in boot block memory it is located. The revision indicator in CMOS is accessible and not protected. If it is accessed in CMOS and modified, this is not a problem. On the next computer boot operation, the CMOS contents as modified will be replaced by an override during boot.

THE NVRAM BLACK BOX

Figure 4:
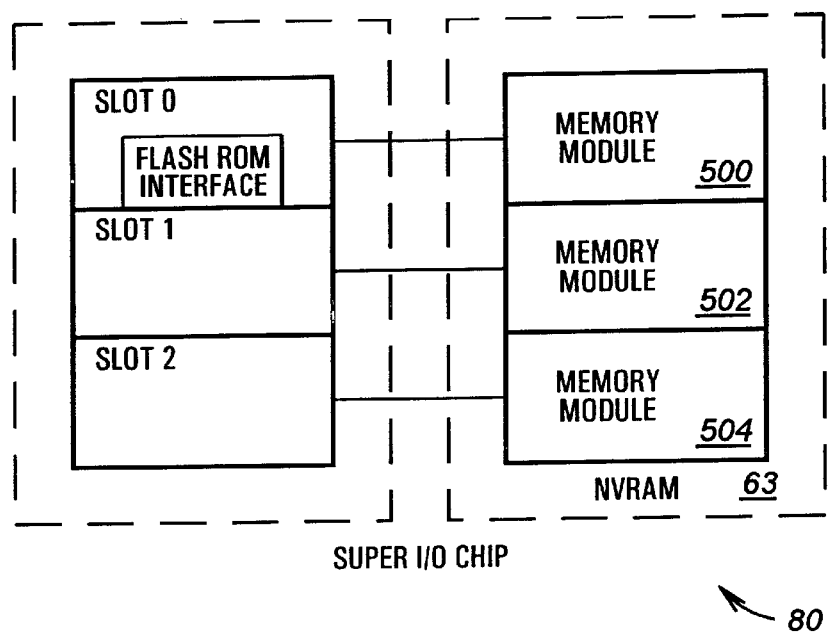
FIG. 4 is a schematic diagram of components of the computer system of FIG. 1 having multiple slots for connecting memory devices.

Turning now to FIG. 4, black box or security device 80 and NVRAM of the super I/O chip 62 are shown in greater detail. The black box is nonvolatile RAM (NVRAM) that is composed of CMOS, yet is accessible only to the BIOS and the operating system (not to any other software running on the computer system). The black box is a protected region within the NVRAM that is writeable only by the BIOS, and readable only by the BIOS and by the operating system. NVRAM is typically provided with back-up batteries to prevent power loss. The BIOS accesses the CMOS by generating an Int 15h followed by the location within CMOS and, if the access is write enabled, data to be written to the CMOS location. This process is described below with respect to boot access to the revision number. With the present invention, the device 80 is of interest because of its storage of revision number information.

The memory security device 80 of FIG. 4 functions to lock and unlock resources within the computer system S, having multiple slots for connecting memory devices. The memory security device 80 of FIG. 4 includes three slots, numbered 0 through 2, each protected according to a different methodology. The contents of the memory devices connected to each security device 80 are accessible only to memory access requests complying with the corresponding methodology. Each slot of device 80 has two states: a locked state, in which data is protected, and an unlocked state. In the locked state, access is denied to the memory device connected to the corresponding slot. To transition to the locked state, a user must enter a "protect resources" command. To transition to unlocked state, transitioning the slot from the locked state, an "access resources" command must be issued, followed by a correct password.

Slot 0 of device 80 includes a flash ROM interface connecting to a flash ROM device. Slot 0 protects the flash ROM 78 from unauthorized writes such as viruses and unauthorized individuals. At power-up, the BIOS loads a flash ROM password into slot 0 and executes the "protect resources" command for that slot. After the system S has completed the boot process and before any other software is loaded, the BIOS issues a "protect resources" command to slot 0, disabling further access to the flash ROM 78.

Slot 1 of device 80 contains the "power-on" password of the user. The security device 80 communicates with the super I/O chip 62 containing the CMOS, by holding a "SIOAEN" and/or a "SIOWCL" signal to keep the super I/O chip 62 from decoding read and/or write cycles to the "power-on" password locations in the CMOS. The AEN signal is derived from ANDing a signal indicating that the black box slot 1 is locked and a signal indicating that the last data write to a real time clock index register was in the "power-on" password range, indicating that the user has missed an opportunity to access the "power-on" password location within. Thus, the security device 80 controls access to the CMOS within the super I/O chip 62. The slot 1 of the black box selectively disables access to the "power on" password storage area within the CMOS. In contrast, the SIOWCL signal operates similarly to the SIOAEN signal, although the SIOWCL signal only prohibits writes and does not prohibit reads to the password. Thus, the SIOWCL signal may be used during subsequent user sessions to determine whether the user password has been entered correctly.

Slot 2 of the security device 80 is accessible only with an administrator password. The limited access of the slot 2 memory device protects system resource information that must be protected to preserve the integrity of the computer system. The administrator password is necessary to access particular registers of CMOS region 404. The unlocking of slot 2, however, also unlocks slot 1, allowing an administrator cognizant of the administrator password to access these CMOS locations. Thus, the administrator has control of these memory locations in the computer system. It is recommended that, prior to unlocking slot 2, the administrator check the status of slot 1 to see if it is locked, since relocking slot 2 does not re-lock slot 1.

THE BOOT PROCESS

Figure 5:
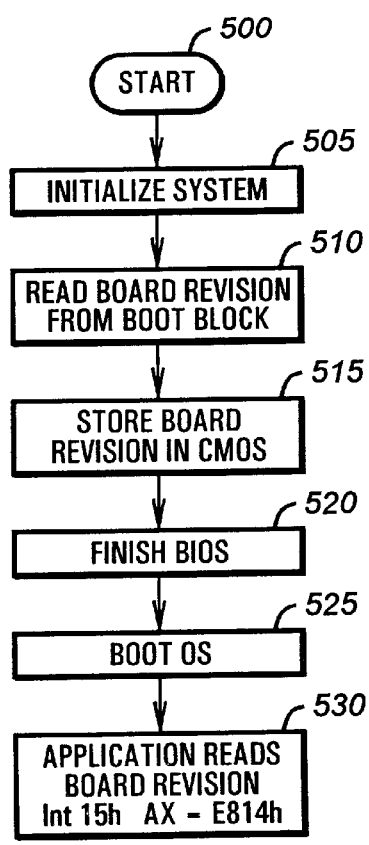
FIG. 5 shows a flowchart of a boot process according to the present invention.

AS shown in FIG. 5, at step 500, computer system S starts the boot process. The system block code is loaded from either the boot portion of the boot block or the normal system ROM image, depending on the result of the ROM image validation. The former case merely allows rehashing of the ROM 78, if a diskette is present and the proper passwords are entered. The latter case, the normal system ROM operation, is of primary interest.

After the start routine 500, of the system S is initialized during step 505 next operation is during step 510 where the board revision indicator is read from the boot block of flash ROM 78. The board revision indicator is then stored in CMOS during step 515. Control is then transferred to step 520 where the remaining, conventional steps of the BIOS routine are completed.

The BIOS typically identifies an Initial Program Load (IPL) device containing additional software, including the operating system (or OS). Generally, the operating system is located on a hard drive, while the BIOS typically resides in the system ROM 78. The BIOS loads, initializes, and begins execution of the operating system and transfers control over to the operating system once the BIOS determines that the operating system has loaded correctly. The BIOS, however, does not terminate once the operating system is loaded; rather, the operating system is able to call various BIOS-related routines during run-time.

The operating system is then executed allowing a user to load and run user applications. The user applications often are commercially-available programs that a user has purchased and installed on the computer system. The operating system loads and installs the applications, and begins execution of the application, when commanded to do so by a user.

According to the present invention, the BIOS includes an instruction 530 or set of instructions for reading a revision number from a nonvolatile memory location, for example in a nonvolatile storage device such as the system ROM 78 or other flash ROM. The revision number indicates what features are available on the computer system hardware platform. The BIOS instruction or instructions also make the revision number available to the operating system and to software applications. Thus, software applications and operating systems are enhanced in their ability to take advantage of computer features. Thereafter, operations of the computer system S may proceed in the normal manner.

BOOT ACCESS TO REVISION NUMBER

BIOS code is code loaded from the ROM image that allows the computer system to begin operation, validate hardware, perform certain platform-specific operations, and then launch an operating system. Many device-specific commands from the subsequently-loaded operating system rely on information loaded by the BIOS and on routines left in memory by the BIOS.

The BIOS and the operating system gain access to the CMOS of the NVRAM by loading a sequence of values into particular registers and generating a particular interrupt after each value.

Generating an Int 15h interrupt with AX set to E823h allows access to CMOS. When BH is set to one, the access is a write access, and when BH is reset to zero, the access is a read access. Generating an Int 15h with AX set to E841h causes default values to be written from the ROM to NVRAM.

The BIOS may obtain the revision number by generating an Int 15h OE814h function. When Int 15h is generated while E814h is contained in the AX register, the revision level is returned in the BL register. The CF flag and the AH register indicate whether the revision number has been successfully obtained. When CF=0 (the carry flag is cleared) and AH=00h, the revision number has been successfully returned, and when CF=1 (the carry flag is set) and AH=86h, the revision number has not been successfully returned.

An example code for retrieving revision number information is set forth below:

mov ax,0E845h
int 15h

A suitable code for copying the board revision indicator from the boot block sector 202 at 4 GB to NVRAM or CMOS is the following:

```
CopyAutoRev  proc                       near
    pushad
    push    es
    push    ds
    call    GoProtectedMode      ;Enter 4GB mode &
                                  Enable A20
    mov     ebx,BB_AUTOREV       ;AutoRev addr in Boot Block
    mov     bl,[ebx]             ;get AutoReg byte
    mov     ax,CMOS_AUTOREV      ;
    call    rnvsWrite            ;save it in CMOS
    call    GoRealMode           ;return to Real Mode
    pop     ds
    pop     es
    popad
    ret
CopyAutoRev  endp
```

With the present invention, the ROM 78 thus simply reads the revision indicator information from its own boot block memory 202. Preferably, this may be aliased under 4 GB, the top of addressable memory, at fixed location 0FFFFFFD4h) during POST. ROM 78 copies this revision indicator data to CMOS during POST so that it can be referenced at run time. This is done without the need for special protected-mode selectors. ROM 78 then can make the revision indicator data available to software of computer system S through BIOS calls in the conventional manner.

Cross-platform applications are actually enhanced by the present invention. Applications intended to run a particular virtual machine can be easily altered to conform to the specificity of the physical machine. Applications can be altered slightly to read the revision number made available by the BIOS instructions, and enable and disable routines accordingly. Thus, the same software can be run on almost any version of hardware platform, without losing the ability to take advantage of platform-specific and revision-specific features.

The foregoing disclosure and description of the invention are illustrative and explanatory thereof, and various changes in number of variables, number of parameters, order of steps, field sizes, data types, code elements, code size, connections, components, and materials, as well as in the details of the illustrated hardware and software and construction and method of operation may be made without departing from the spirit of the invention.

What is claimed is:

1. A computer system, comprising:
   a nonvolatile storage device containing:
      a revision indicator for identifying a revision of the computer system hardware platform, the revision indicator stored in an area of the nonvolatile storage device unavailable for update by a user despite the revision indicator being otherwise accessible to the user;
      processor executable code, the processor executable code stored in a second area of the nonvolatile storage device available for update by a user;
   other processor code executable and not executable depending on revision indicator value; and
   a display for displaying the revision indicator.

2. The computer system of claim 1, further comprising:
   a BIOS routine for accessing the revision indicator and providing the revision indicator to the display.

3. The computer system of claim 1, further comprising:
   a BIOS routine for accessing the revision number and providing the revision number to an operating system.

4. A computer system, comprising:
   a nonvolatile storage device containing:
      a revision indicator for identifying a revision of the computer system hardware platform, the revision indicator stored in an area of the nonvolatile storage device unavailable for update by a user despite the revision indicator being otherwise accessible to the user;
   a display for displaying the revision indicator;
   a processor for executing instructions; and
   software containing a set of instructions for executing on the processor, the software having different portions of code executable when the revision indicator that is stored in an area of the nonvolatile storage device unavailable for update by the user has a first value and not executable when the revision indicator has a second value.

5. The computer system of claim 4, wherein the computer system has a power on, self-test routine and wherein the BIOS routine accesses the revision number during the power on, self-test routine.

6. The computer system of claim 5, wherein the revision indicator is presented only during the power on, self-test routine.

7. The computer system of claim 4, further comprising:
   a set of instructions for reading the revision indicator from the nonvolatile storage device into active memory.

8. The computer system of claim 4, further including:
   a keyboard.

9. The computer system of claim 4, further including:
   a disk memory.

10. The computer system of claim 1, wherein:
    the nonvolatile storage device has multiple regions including a first region having a lower level of security and a second unalterable region having a higher level of security containing factory installed information, the information in the first region being administrator-alterable and the revision indicator information being in the second region.

11. The computer system of claim 10, wherein the information in the second region is alterable only on removal of the nonvolatile storage device from the computer system.

12. A computer system comprising:
a processor for executing instructions;
a nonvolatile storage device, the nonvolatile storage device comprising:
   an alterable set of instructions for initializing the processor;
   an unalterable revision indicator for identifying a revision of the computer system hardware platform; and
   a set of instructions for providing the unalterable revision indicator to software during execution of the set of instructions for initializing the processor, the software having code executable and not executable depending on revision indicator value; and
a display for indicating the unalterable revision indicator provided by the set of instructions.

13. The computer system of claim 12, wherein the nonvolatile storage device further comprises:
an interface configured to provide the unalterable revision indicator to software during the execution of the set of instructions for initializing the processor, the hardware platform having a set of properties; and
a set of instructions for determining the properties of the hardware platform and for providing the unalterable revision indicator to software on the hardware platform according to the properties.

14. The computer system of claim 12, wherein the nonvolatile storage device further comprises:
a first platform-dependent set of instructions within a software routine;
a set of instructions for copying the set of instructions into active memory; and
a set of instructions for reading the unalterable revision number.

15. A computer system comprising:
a processor for executing instructions;
a nonvolatile storage device, the nonvolatile storage device comprising:
   a set of instructions for initializing the processor;
   an unalterable revision indicator for identifying a revision of the computer system hardware platform;
   a set of instructions for providing the unalterable revision indicator to software during execution of the set of instructions for initializing the processor;
   a first platform-dependent set of instructions within a software routine;
   a set of instructions for copying the set of instructions into active memory;
   a set of instructions for reading the unalterable revision number; and
   a set of instructions for disabling software that is not compatible with the platform as defined by the unalterable revision indicator; and
a display for indicating the unalterable revision indicator provided by the set of instructions.

16. In a computer system containing a processor for executing instructions, a method comprising the steps of:
initializing the processor;
reading an unalterable revision indicator from a nonvolatile storage device for identifying a revision of the computer system hardware platform;
reading alterable processor executable code from the nonvolatile storage device;
providing the unalterable revision indicator to software during execution of the step of initializing the processor; and
executing or not executing other code depending on revision indicator value.

17. The method of claim 16, further configured to provide the revision indicator to software during the execution of the step of initializing the processor, the hardware platform having a set of properties, the method further comprising the step of:
determining the properties of the hardware platform and for providing the unalterable revision indicator to software on the hardware platform according to the properties.

18. A nonvolatile storage device containing code for a computer system having a processor and a display, said nonvolatile storage device code causing the display to perform steps to display a revision indicator for the computer system, the code comprising:
a set of instructions for initializing the processor;
an unalterable revision indicator for identifying a revision of the computer system hardware platform;
an alterable set of instruction for execution by the processor; and
a set of instructions for providing the unalterable revision indicator to software during execution of the set of instructions for initializing the processor, the software having code executable and not executable depending on revision indicator value.

19. The nonvolatile storage device of claim 18, further comprising:
an interface configured to provide the revision indicator to software during the execution of the set of instructions for initializing the processor, the hardware platform having a set of properties; and
a set of instructions for determining the properties of the hardware platform and for providing the unalterable revision indicator to software on the hardware platform according to the properties.

20. The nonvolatile storage device of claim 18, the code further comprising:
a first platform-dependent set of instructions with a software routine;
a set of instructions for copying the set of instructions into active memory; and
a set of instructions for reading the unalterable revision number.

21. A nonvolatile storage device containing code for a computer system having a processor and a display, said nonvolatile storage device code causing the display to perform steps to display a revision indicator for the computer system, the nonvolatile storage device comprising:
a set of instructions for initializing the processor;
an unalterable revision indicator for identifying a revision of the computer system hardware platform; and
a set of instructions for providing the unalterable revision indicator to software during execution of the set of instructions for initializing the processor;
a first platform-dependent set of instructions with a software routine;
a set of instructions for copying the set of instructions into active memory;
a set of instructions for reading the unalterable revision number;
a set of instructions for disabling software that is not compatible with the platform as defined by the revision indicator.

22. The computer system of claim 1, wherein the processor executable code is BIOS code.

23. The computer system of claim 1, wherein the area unavailable for update is a boot block.

* * * * *